April 19, 1955 G. L. LUPFER Re. 23,983

LIQUID LEVEL INDICATOR

Original Filed June 30, 1949

INVENTOR.
GEORGE L. LUPFER
BY
Oberlin & Limbach
ATTORNEYS.

United States Patent Office

Re. 23,983

Reissued Apr. 19, 1955

23,983

LIQUID LEVEL INDICATOR

George L. Lupfer, Maple Heights, Ohio, assignor to The Standard Oil Company, Cleveland, Ohio, a corporation of Ohio Original No. 2,696,738, dated December 14, 1954, Serial No. 102,291, June 30, 1949. Application for reissue February 18, 1955, Serial No. 489,316

2 Claims. (Cl. 73—299)

Matter enclosed in heavy brackets [ ] appears in the original patent but forms no part of this reissue specification; matter printed in italics indicates the additions made by reissue.

Sight gauge glasses have a great practical advantage of being direct liquid level indicators and hence primarily capable of giving accurate indication. However, with some liquids, and some temperature conditions, an obscuring film may deposit on the interior surface of the glass tube and necessitate frequent cleaning out. Particularly is this the case where there are liquids and vapors at elevated temperatures, and where the liquids are oils, chemicals, etc. Ordinarily steam boilers incur such difficulty especially with some waters, and some boiler compounds, etc. Various accessory means have been adapted to gauges to facilitate and expedite their cleaning, but it is readily apparent that it would be better yet if fouling of gauge glasses could be prevented and thereby eliminate all need of cleaning. In accordance with the present invention it now becomes possible to provide the advantage of direct and accurate liquid level indication, with at the same time a construction obviating the common fouling trouble. Other objects and advantages will appear from the following description.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
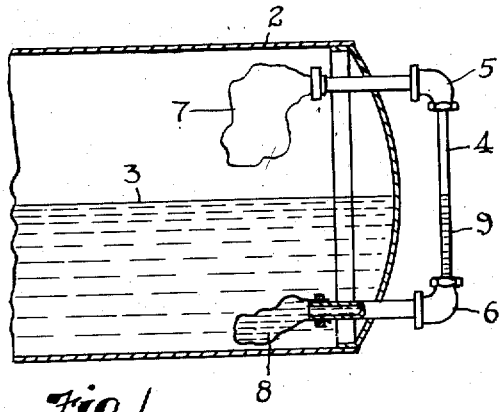
Figure 2:
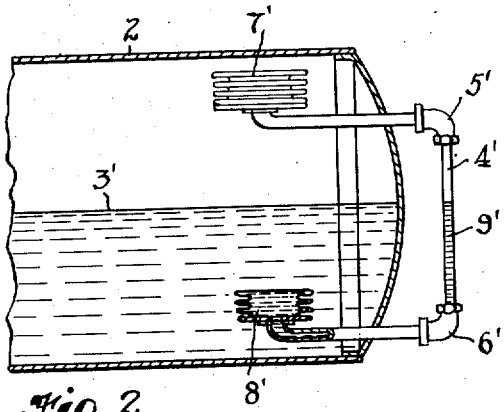

In said annexed drawing:

Figs. 1 and 2 illustrate in section embodiments of the invention in respectively slightly different detail.

In general, the present improvements involve a liquid level gauge glass with indicating liquid therein which shows the level of liquid in the container, being responsive to liquid and vapor spaces but without direct connection.

As seen in Fig. 1 of the drawing, a container or receptacle 2 having a liquid content to be indicated, as shown by the liquid level 3, is provided with a gauge glass 4, having connections 5 and 6 into the vapor space and the liquid space respectively of the container. On the end of the connection into the vapor space is an expansible and contractible member 7. And on the end of the connection into the liquid space is an expansible and contractible member 8. These are here illustrated as on the order of balloons secured to the ends of the pipe connection. The material of which such members are made can vary, depending on the operating conditions and the fluids being gauged, and for example in the case of water and inert aqueous solutions at ordinary temperatures, the material may be rubber, butyl synthetic rubber; or other synthetic form of rubber, grease-resistant, may be employed, or in some cases other plastic materials. As seen, the sight glass system thus equipped is a sealed system without direct connection into the vapor and liquid spaces of the container, but being directly responsive to their pressure conditions and particularly as involving the head of liquid. In the gauge glass is an indicator liquid 9. Depending upon the particular operating conditions this can be water in some instances, or variously it may be another liquid such as hydrocarbons, higher alcohols and ethers and esters, etc., and the boiling point may be coordinated to range sufficiently high to cover the operating temperatures, and desirably the indicator liquid may be of similar gravity with respect to the liquid being gauged, and in general the viscosity of the indicator liquid should be such as to afford free flow or response to the liquid head in the receptacle. Illustrative of indicating liquids are water, petroleum distillates, particularly solvent-extracted, de-waxed distillates or oils, cyclohexanol, glycol monoethyl ether, etc. Where desired, the indicator liquid may be colored by means of a dye, such as red, black, green, etc., in order to increase the visibility of the column in the gauge glass.

In the form shown in Fig. 2, instead of elastic balloons the expansible and contractible members 7', 8' are expansible and contractible metallic bellows. In similar manner these are on the ends of the top and bottom connections 5', 6' leading to the gauge glass 4', and again the latter contains the indicator liquid 9'. The metallic bellows form is of advantage where liquids and vapors of active solvent character are to be encountered, and if the bellows be made of such metal as Monel or nickel-containing alloys, liquids and vapors of corrosive character can be gauged.

The expansible and contractible member which is immersed in the liquid must be sufficiently large to contain enough indicator liquid to fill the entire gauge glass. The expansible and contractible member in the vapor space must be sufficiently large to accommodate the pressure range between atmospheric pressure and maximum pressure in the container, without completely collapsing. These dimensions can be readily calculated for any given installation. As an example, take the case of a tower in a petroleum crude distilling system, wherein a level of oil is ordinarily about 4 ft. head and the operating pressure is around 15 lbs. per sq. in., with a maximum design pressure of 30 lbs., and the temperature runs around 600° F. With a gauge glass having an equivalent of internal diameter of ¾ in. and an equivalent length, including all fittings and valves, of 5 ft., the cross sectional area of the gauge glass interior 0.44 sq. in. x 60 in. is substantially 26 cu. in. total. Then, the volume of the expansible and contractible member=26 cu. in. and as the $$\text{volume of a sphere}=\frac{4\pi r^3}{3}$$

r=1.84 in., and the diameter=2r=3.68 in. And for the expansible and contractible member in the vapor space, $P_m V_g = P(V_g + V_b)$, in which $P_m$ is maximum design pressure, $V_g$ is the gauge volume, P is the atmospheric pressure, and $V_b$ is the volume of the expansible and contractible member, and taking the illustrative figures above, and the atmospheric P as 14.7 lbs. per sq. in. absolute, the volumetric content works out as 53 cu. in. And as $$53=\frac{4\pi r^3}{3}$$

r=2.33 in., and 2r=4.66 in. for the calculated diameter of the expansible and contractible member. In this case a desirable indicator liquid in the gauge glass could be a solvent-extracted, de-waxed petroleum distillate, as it would have a boiling point well above the operating temperature 600° F. at 15 lbs. per sq. in. gauge, and its specific gravity would correspond closely to the liquid in the tower, and would also be stable over a practicable period of time.

As the indicator liquid in the gauge glass, although sealed off from contact with the contents of the container being gauged, is however directly responsive thereto by virtue of the expansible and contractible members, the height of the column of the indicator liquid in the gauge glass always corresponds to the height of the liquid inside of the container, and the gauge glass is completely protected against entry of fouling vapors and liquids.

Other modes of applying the principle of the invention may be employed, change being made as regards the details described, provided the features stated in any of the following claims, or the equivalent of such, be employed.

I therefore particularly point out and distinctly claim as my invention:

1. In liquid level gauge apparatus including a receptacle and a gauge glass thereon, means providing in the glass a sight-meniscus between an upper gasiform component separated from but exposed to a vapor space of the receptacle in an expansible and contractible member connected to the upper end of the gauge glass, and a liquid component in the lower end of the gauge glass connected to an expansible and contractible member exposed in the liquid space of the receptacle, said upper expansible member being larger than the lower expansible member, the volume relationship of said members being such as to [substantially reduce the movement of the meniscus throughout the range of the level of the liquid.] *permit the height of said liquid*

*component in said gauge glass to accurately and clearly correspond to the actual height of the liquid in the receptacle to be gauged.*

2. A liquid level gauge apparatus of the construction defined in claim 1 and in which the liquid component in the lower end of the gauge glass consists of a hydrocarbon oil of higher boiling point than the liquid in the receptacle being gauged, said oil filling also the connected lower pressure-responsive member.

References Cited in the file of this patent or the original patent

UNITED STATES PATENTS

| | | |
|---|---|---|
| 1,691,545 | Ernst | Nov. 13, 1928 |

FOREIGN PATENTS

| | | |
|---|---|---|
| 315,895 | Germany | Nov. 15, 1919 |
| 198,532 | Great Britain | June 7, 1923 |